United States Patent Office 3,116,334
Patented Dec. 31, 1963

3,116,334
NOVEL PHOSPHINE OXIDES AND METHODS
OF PREPARING SAME
Sheldon A. Buckler and Martin Epstein, Stamford, Conn., assignors to American Cyanamid Company, New York, N.Y., a corporation of Maine
No Drawing. Filed Apr. 6, 1960, Ser. No. 20,262
21 Claims. (Cl. 260—606.5)

The present invention relates to novel phosphine oxides and their preparation. More particularly, the instant discovery pertains to the reaction of primary phosphine oxides with carbonyl compounds, i.e., aldehydes and ketones, to produce corresponding secondary and tertiary phosphine oxide derivatives.

The novel phosphine oxides contemplated herein, plus a ready route to these compounds, are a very significant contribution to the art, in view of the fact that the novel oxides are valuable as complexing agents for metal values. Uranyl values, for example, can be selectively leached from an ore containing the same by employing techniques known in the art, as shown by Blake et al. in the Atomic Energy Commission Report ORNL–1903, May 13, 1955. Furthermore, the straightforward, single-step method provided herein affords the very desirable oxides in high purity and good yields.

Pursuant to the instant discovery a primary phosphine oxide is brought into reactive contact with a carbonyl compound, i.e., an aldehyde or a ketone, in the presence of an acid or base and, if desired, in an inert organic solvent medium, such as an alcohol, and the resulting corresponding secondary or tertiary phosphine oxide recovered.

The following equations best illustrate the process contemplated herein:

I
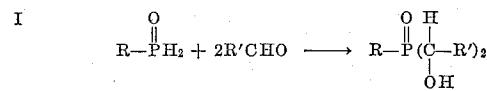

II
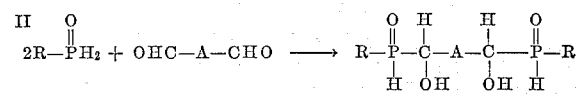

II(a)
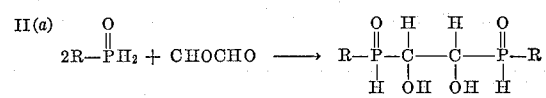

III
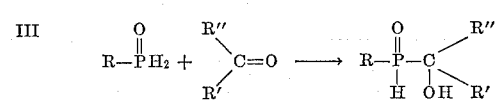

The characters R, R', R" and A in the above formulae have the following meanings: R and R', respectively, represent a member selected from the group consisting of alkyl having from 1 to 18 carbon atoms, branched and straight chain, substituted alkyl having from 1 to 18 carbon atoms, branched and straight chain, alkenyl having from 1 to 18 carbon atoms, branched and straight chain, substituted alkenyl having from 1 to 18 carbon atoms, branched and straight chain; cycloalkyl; and phenyl, substituted phenyl; in addition, R' equal H; R" is a member selected from the group consisting of H; lower alkyl; and phenyl; and R" taken in conjunction with R' may comprise the residue of a cycloalkyl ring; for example, in equation III above the carbonyl

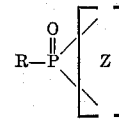

also represents cyclohexanone; A is a member selected from the group consisting of lower alkylene, monohydroxy-substituted lower alkylene and phenylene.

The novel products of the present invention may be represented by the following generic formula $$R-\overset{O}{\underset{\|}{P}}\begin{bmatrix} / \\ Z \\ \backslash \end{bmatrix}$$

wherein R has the meaning given hereinabove and Z is a member selected from the group consisting of

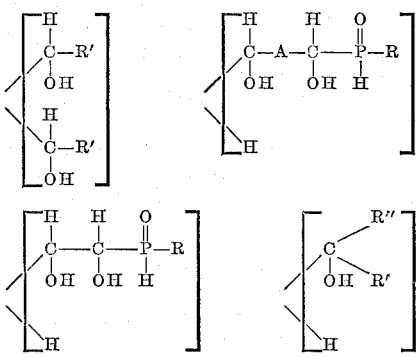

wherein R, R', R" and A have the meaning given hereinabove.

Typical primary phosphine oxide reactants useful for preparing the secondary and tertiary oxides of the present discovery are isobutylphosphine oxide, cyclohexylphosphine oxide, octylphosphine oxide, methylphosphine oxide, isopropylphosphine oxide, 1-ethylpropylphosphine oxide, cyclopentylphosphine oxide, phenylphosphine oxide, 2-cyanoethylphosphine oxide, dodecylphosphine oxide, allylphosphine oxide, 2-hydroxyethylphosphine oxide, p-chlorophenylphosphine oxide, 2-carbethoxyethylphosphine oxide, and the like. It follows from this representative list of primary phosphine oxide reactants that typical substituents on the R moiety within the purview of the present invention are nitrile, halogen, hydroxy, carbo-lower alkoxy, and the like.

The primary phosphine oxide reactants contemplated herein may be prepared as described in applicants' copending U.S. applicant Serial No. 824,169, filed July 1, 1959, which is incorporated herewith by reference.

Representative carbonyl compounds within the generic definitions given hereinabove are benzaldehyde, p-chlorobenzaldehyde, butyraldehyde, 9-hydroxynonanal, p-hydroxybenzaldehyde, 5-methoxypentanal, m-nitrobenzaldehyde, 4-octenal, glyoxylic acid, dodecylaldehyde, succinaldehyde, glyoxal, 2-hydroxyadipaldehyde, terephthalaldehyde, isophthalaldehyde, and the like.

As in the case of the primary phosphine oxide reactants, the substituents contemplated herein for the carbonyl compounds are, typically, halogen, hydroxy, lower alkoxy, nitro, carboxy, and the like.

Referring to Equation I, supra, the aldehyde reactant relative to the primary phosphine oxide reactant is generally present in a molar ratio of at least 2:1. A substantial stoichiometric excess of the carbonyl compound, e.g., on the order of 10:1 or greater, may be employed, however, without deleterious effect. Generally, however, about equivalent or about stoichiometric amounts are used.

The reaction may be carried out in the presence of an acid, preferably a mineral acid, or a base. Typical acids are HBr, HI, $H_2SO_4$, HCl, $H_3PO_4$, $HNO_3$, and the like, strong organic acids, such as sulfonic and phosphonic acids, e.g., methanesulfonic acid, p-toluenesulfonic acid, benzenesulfonic acid, phenylphosphonic acid, and the like. Other similar acids which under the conditions of the reaction are non-oxidizing with respect to the reactants and reaction products are also contemplated.

Typical strong organic and inorganic base catalysts within the purview of the present discovery are triethylamine, heptamethylguanidine, pentamethylguanidine, alkali metal alkoxides, such as sodium methoxide, potassium ethoxide, sodium butoxide, alkali metal hydroxides, such as sodium hydroxide and potassium hydroxide, and the like.

Good results are obtained when reaction is made to take place in the presence of an inert organic solvent. Typical solvents are lower alcohols, such as methanol, ethanol, and the like; ethers, such as tetrahydrofuran, dioxane, and the like; water; and mixtures of these reactants. Furthermore, any sequence of addition of the reactants may be employed. Likewise, super-atmospheric, sub-atmospheric and atmospheric pressures are contemplated herein.

A wide range of temperatures, on the order of about 0° C. to about 100° C., may be employed. Ambient temperatures (20° C.–25° C.), for example, give very desirable results.

Referring to moiety (a) in Equation II, above, typical lower alkylene groups are methylene, ethylene, trimethylene, propylene, and the like.

Referring to Equations II and II(a), supra, the dialdehyde and the primary phosphine oxide are generally brought together in a ratio of 1:2; however, almost any excess of either reactant relative to the other is contemplated herein. Generally, too great an excess either way is cumbersome and impractical.

The reactants are otherwise brought together under the same conditions given hereinabove for Equation I type reactions, including the use of a solvent.

Referring to Equation III, supra, while the reaction conditions parallel those given hereinabove for Equations I and II, it will be noted that a preferred embodiment involves the use of about equimolar amounts of the reactants. The reaction conditions are otherwise identical with the Equations I and II reactions from the standpoint of temperature, mixing sequence, pressure, solvents, etc.

The reactions of Equations I–III above are best carried out in an inert, i.e., non-oxidizing, atmosphere. Several typical ways of doing this involve the use of an atmosphere of $N_2$, He, $H_2$, or the like.

The present invention will best be understood by reference to the following examples:

EXAMPLE I

Bis(Alpha-Hydroxybenzyl)Isobutylphosphine Oxide

A solution of 5.6 grams of isobutylphosphine oxide (0.05 mole), 40 milliliters of methanol, 13.8 grams of benzaldehyde (0.13 mole) and 5 milliliters of concentrated HCl is allowed to stand for 24 hours under nitrogen. A white solid bis(α-hydroxybenzyl)isobutylphosphine oxide precipitates and is colletced. It is recrystallized from acetonitrile and gives a melting point of 157° C.–158° C.

EXAMPLE II

Bis(Alpha-Hydroxy-Parachlorobenzyl)Cyclohexylphosphine Oxide

A solution of 5.3 grams of cyclohexylphosphine oxide (0.043 mole) dissolved in 40 milliliters of ethanol, 11.2 grams para-chlorobenzaldehyde (0.08 mole), and 5 milliliters of 50 percent $H_2SO_4$ by weight is allowed to stand for 3 days under nitrogen. The resulting mixture is poured onto ice and extracted with chloroform. The chloroform is removed to yield a semi-solid which when washed with ether precipitates bis(alpha-hydroxy-parachlorobenzyl)cyclohexylphosphine oxide. It is recrystallized from ethanol to give a melting point of 176° C.–178° C.

EXAMPLE III

Bis(Hydroxymethyl)Octylphosphine Oxide

A solution of 6.5 grams of octylphosphine oxide (0.04 mole), dissolved in 60 milliliters of methanol, 8 grams of 37 percent by weight formaldehyde solution (0.1 mole) and 10 milliliters of concentrated HCl is allowed to stand for 2 weeks under nitrogen. The solution is poured onto ice and extracted with chloroform to yield on evaporation bis(hydroxymethyl)octylphosphine oxide.

EXAMPLES IV–VII

The following provides further illustrative examples in tabular form. The experimental conditions and work up are identical in every essential respect with Example III. In all cases the catalyst is concentrated HCl.

TABLE I

| Example | Primary Phosphine Oxide | Carbonyl Compound | Product | Structure |
|---|---|---|---|---|
| IV | isopropylphosphine oxide. | benzaldehyde. | bis(α-hydroxybenzyl)isopropylphosphine oxide. | $(CH_3)_2CH-P(=O)(-CH(OH)C_6H_5)_2$ |
| V | 1-ethylpropylphosphine oxide. | p-chlorobenzaldehyde. | bis(α-hydroxy-p-chlorobenzyl)-1-ethylpropylphosphine oxide. | $(CH_3CH_2)_2CH-P(=O)(-CH(OH)C_6H_4Cl)_2$ |
| VI | cyclopentylphosphine oxide. | butyraldehyde. | bis(1-hydroxybutyl)cyclopentylphosphine oxide. | cyclopentyl-$P(=O)(-CH(OH)CH_2CH_2CH_3)_2$ |
| VII | phenylphosphine oxide. | 9-hydroxynonanal. | bis(1,9-dihydroxynonyl)phenylphosphine oxide. | $C_6H_5-P(=O)[-CH(OH)(CH_2)_7CH_2OH]_2$ |
| VIII | cyanoethylphosphine oxide. | p-hydroxybenzaldehyde. | bis(α-hydroxy-p-hydroxybenzyl)cyanoethylphosphine oxide. | $CNCH_2CH_2-P(=O)(-CH(OH)C_6H_4-OH)_2$ |
| IX | dodecylphosphine oxide. | 5-methoxypentanal. | bis(1-hydroxy-5-methoxy-pentyl)dodecylphosphine oxide. | $CH_3(CH_2)_{11}P(=O)[-CH(OH)(CH_2)_3CH_2OMe]_2$ |

TABLE I—Continued

| Example | Primary Phosphine Oxide | Carbonyl Compound | Product | Structure |
|---|---|---|---|---|
| X | allylphosphine oxide. | m-nitrobenzaldehyde. | bis(α-hydroxy-m-nitrophenyl)-allylphosphine oxide. | $CH_2=CHCH_2\overset{O}{\underset{\|}{P}}\left(-CH\underset{OH}{\overset{NO_2}{\bigcirc}}\right)_2$ |
| XI | p-chlorophenylphosphine oxide. | 4-octenal | bis(1-hydroxy-4-octenyl)-p-chlorophenylphosphine oxide. | $Cl-\bigcirc-\overset{O}{\underset{\|}{P}}\left[\underset{OH}{CH}(CH_2)_2CH=CH(CH_2)_2CH_3\right]_2$ |
| XII | octylphosphine oxide. | dodecylaldehyde | bis(1-hydroxydodecyl)octylphosphine oxide. | $octyl-\overset{O}{\underset{\|}{P}}\left[\underset{OH}{CH}(CH_2)_{10}CH_3\right]_2$ |

EXAMPLE XIII

*Bis(Alpha-Hydroxybenzyl)Isobutylphosphine Oxide*

The procedure of Example I, above, is repeated in every essential respect with the exception that 1 gram of sodium methoxide is used in place of the concentrated HCl. The same product is obtained.

EXAMPLE XIV

*Bis(Alpha-hydroxy-parachlorobenzyl)Cyclohexylphosphine Oxide*

The procedure of Example II, above, is repeated in every essential respect with the exception that 1 gram of triethylamine is used in place of the concentrated HCl. The same product is obtained.

EXAMPLE XV

*Bis(Hydroxymethyl)Octylphosphine Oxide*

The procedure of Example III, above, is repeated in every essential respect with the exception that 2 milliliters of heptamethylguanidine is used in place of the concentrated HCl. The same product is obtained.

EXAMPLE XVI

*1,2-Dihydroxyethylene-Bis(Octylphosphine Oxide)*

A solution of 10 grams of octylphosphine oxide (0.062 mole) is dissolved in 40 milliliters of methanol, 6.3 grams of 30 percent by weight glyoxal solution (0.033 mole) and 5 milliliters concentrated HCl is allowed to stand at room temperature under nitrogen for one day. The solid (5.5 grams) that separates is filtered and identified as 1,2 - dihydroxyethylene - bis(octylphosphine oxide) in 44 percent by weight of the theoretical yield. The solid is recrystallized from acetic acid to give material having a melting point of 194° C.–196° C.

EXAMPLE XVII

*1,5-Dihydroxypentamethylene-Bis(Octylphosphine Oxide)*

A solution of 9.4 grams of octylphosphine oxide (0.058 mole) dissolved in 35 milliliters of methanol, 11.6 grams of 25 percent by weight glutaraldehyde solution (0.029 mole) and 10 milliliters of concentrated HCl is allowed to stand at room temperature under nitrogen for 7 days. The mixture is filtered to obtain 3.1 grams of 1,5-dihydroxypentamethylene-bis(octylphosphine oxide) in 34 percent by weight of the theoretical yield. The sample is recrystallized from isopropanol to give material having a melting point of 174° C.–175° C.

EXAMPLES XVIII–XXIII

The following provides further illustrative examples in tabular form. The experimental conditions and work up are the same in every essential respect as Example XVI, above.

TABLE II

| Example | Primary Phosphine Oxide | Dialdehyde | Product | Structure |
|---|---|---|---|---|
| XVIII | octylphosphine oxide. | succinaldehyde | 1,4-dihyrdoxytetramethylene-bis(octylphosphine oxide). | $octyl-\overset{O}{\underset{H}{\overset{\|}{P}}}-\underset{OH}{CH}(CH_2)_2\underset{OH}{CH}-\overset{O}{\underset{H}{\overset{\|}{P}}}-octyl$ |
| XIX | isobutylphosphine oxide. | glyoxal | 1,2-dihydroxyethylene-bis(isobutylphosphine oxide). | $isobutyl-\overset{O}{\underset{H}{\overset{\|}{P}}}-\underset{OH}{CH}\underset{OH}{CH}-\overset{O}{\underset{H}{\overset{\|}{P}}}-isobutyl$ |
| XX | phenylphosphine oxide. | glyoxal | 1,2-dihydroxyethylene-bis(phinylphosphine oxide). | $phenyl-\overset{O}{\underset{H}{\overset{\|}{P}}}-\underset{OH}{CH}\underset{OH}{CH}-\overset{O}{\underset{H}{\overset{\|}{P}}}-phenyl$ |
| XXI | cyclohexylphosphine oxide. | 2-hydroxy-adipaldehyde. | 1,2,6-trihydroxyhexamethylene - bis(cyclohexylphosphine oxide). | $\bigcirc-\overset{O}{\underset{H}{\overset{\|}{P}}}-\underset{OH}{CH}-\underset{OH}{CH}(CH_2)_3\underset{OH}{CH}-\overset{O}{\underset{H}{\overset{\|}{P}}}-\bigcirc$ |
| XXII | 2-cyanoethylphosphine oxide. | terephthalaldehyde. | α,α′-dihydroxy-1,4-xylylene-bis(2-cyanoethylphosphine oxide). | $CNCH_2CH_2\overset{O}{\underset{H}{\overset{\|}{P}}}-\underset{OH}{CH}-\bigcirc-\underset{OH}{CH}-\overset{O}{\underset{H}{\overset{\|}{P}}}CH_2CH_2CN$ |
| XXIII | p-chlorophenyl phosphine oxide. | isophthalaldehyde. | α,α′- dihydroxy - 1,3 - xylylene - bis(p - chlorophenylphosphine oxide). | $Cl-\bigcirc-\overset{O}{\underset{H}{\overset{\|}{P}}}-\underset{OH}{CH}-\bigcirc-\underset{OH}{CH}-\overset{O}{\underset{H}{\overset{\|}{P}}}-\bigcirc-Cl$ |

EXAMPLE XXIV

1,2-Dihydroxyethylene-Bis(Octylphosphine Oxide)

The procedure of Example XVI, above, is repeated in every essential respect with the exception that 2 milliliters of pentamethylguanidine is used in place of concentrated HCl. The same product is obtained.

EXAMPLE XXV

1,5-Dihydroxypentamethylene-Bis(Octylphosphine Oxide)

The procedure of Example XVII, above, is repeated in every essential respect with the exception that 1.5 grams of potassium hydroxide is used in place of the concentrated HCl. The same product is obtained.

EXAMPLE XXVI

1-Hydroxycyclohexyloctylphosphine Oxide

A solution of 4.9 grams of octylphosphine oxide (0.03 mole) dissolved in 30 milliliters of ethanol, 7.0 grams cyclohexanone (0.07 mole) and 12 milliliters concentrated HCl is refluxed for 4 hours under nitrogen. The solvent is evaporated at reduced pressure and the remaining gum triturated with ether to yield 2.7 grams of 1-hydroxycyclohexyloctylphosphine oxide in 35 percent by weight yield. The solid is recrystallized from ethanol to give a melting point of 101° C.–103° C.

EXAMPLES XXVII–XXXI

The following provides further illustrative examples in tabular form. The conditions and work up are similar in every essential respect to Example XXVI, above.

while the present invention has been described in detail with respect to specific embodiments thereof, it is not intended that these details be construed as limitations upon the scope of the invention, except insofar as they appear in the appended claims.

We claim:

1. A phosphine oxide conforming to the formula

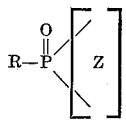

wherein Z represents a member selected from the group consisting of

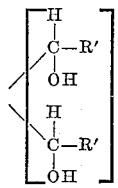 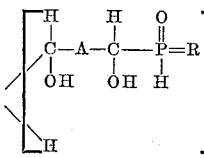

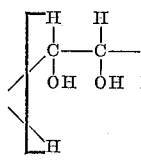 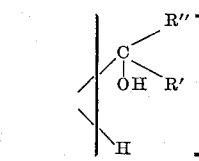

wherein

R in the above formulae represents a member selected

TABLE III

| Example | Primary Phosphine Oxide | Carbonyl Compound | Product | Structure |
|---|---|---|---|---|
| XXVII | cyclohexylphosphine oxide | $CH_3$<br>$\;\;\;\;\;\;\;\;C=O$<br>$CH_3$ | 1-hydroxy-1-methyl ethylcyclohexyl-phosphine oxide. | cyclohexyl—P(=O)(H)—C(OH)(CH$_3$)(CH$_3$) |
| XXVIII | 2-cyanoethylphosphine oxide. | phenyl—C(=O)CH$_3$ | α-hydroxy-α-methylbenzyl-2-cyano-ethylphosphine oxide. | CNCH$_2$CH$_2$—P(=O)(H)—C(OH)(CH$_3$)—phenyl |
| XXIX | phenylphosphine oxide | $CH_3CH_2CH_2$<br>$\;\;\;\;\;\;\;\;C=O$<br>$CH_3CH_2CH_2$ | 1-hydroxy-1-propylbutylphenylphos-phine oxide. | phenyl—P(=O)(H)—C(OH)(CH$_2$CH$_2$CH$_3$)(CH$_2$CH$_2$CH$_3$) |
| XXX | isobutylphosphine oxide | phenyl—CHO | α-hydroxybenzylisobutylphosphine oxide. | (CH$_3$)$_2$CHCH$_2$—P(=O)(H)—CH(OH)—phenyl |
| XXXI | cyclohexylphosphine oxide | CH$_3$CH$_2$CH$_2$CHO | 1-hydroxybutylcyclohexylphosphine oxide. | cyclohexyl—P(=O)(H)—CH(OH)CH$_2$CH$_2$CH$_3$ |
| XXXII | butylphosphine oxide | CH$_3$(CH$_2$)$_{10}$CHO | 1-hydroxydodecylbutylphosphine oxide. | CH$_3$CH$_2$CH$_2$CH$_2$—P(=O)(H)—CH(OH)(CH$_2$)$_{10}$CH$_3$ |
| XXXIII | octylphosphine oxide | HCHO | 1-hydroxymethyloctylphosphine oxide. | octyl—P(=O)(H)—CH$_2$OH |

EXAMPLE XXXIV

1-Hydroxycyclohexyloctylphosphine Oxide

The procedure of Example XXV is repeated in every essential respect with the exception that 2 grams of sodium hydroxide are used in place of the concentrated HCl. The same product is obtained.

Clearly, the instant discovery encompasses numerous modifications within the skill of the art. Consequently, from the group consisting of alkyl having from 1 to 18 carbon atoms, branched and straight chain, alkenyl having from 1 to 18 carbon atoms, branched and straight chain, substituted alkyl having from 1 to 18 carbon atoms, branched and straight chain, substituted alkenyl having from 1 to 18 carbon atoms, branched and straight chain; cycloalkyl; phenyl and substituted phenyl; said substituents for alkyl, alkenyl and phenyl represented by R being selected from the group consisting of nitrile, halogen, hydroxy and carbo-lower alkoxy;

R'' represents a member selected from the group consisting of hydrogen; lower alkyl; and phenyl;

R' represents a member selected from the group consisting of alkenyl having from 1 to 18 carbon atoms, branched and straight chain, substituted alkenyl having from 1 to 18 carbon atoms, branched and straight chain; phenyl and substituted phenyl; said substituents for alkenyl and phenyl being selected from the group consisting of halogen, hydroxy, lower alkoxy, nitro and carboxy; however, when R' is selected from the group consisting of said phenyl and said substituted phenyl, R'' is phenyl;

A is a member selected from the group consisting of lower alkylene, monohydroxy-substituted lower alkylene and phenylene.

2. Bis(alpha-hydroxybenzyl)isobutylphosphine oxide.

3. Bis(alpha-hydroxy-parachlorobenzyl)cyclohexylphosphine oxide.

4. 1,2-dihydroxyethylene-bis(octylphosphine oxide).

5. 1,5-dihydroxypentamethylene-bis(octylphosphine oxide).

6. A method of preparing a tertiary oxide conforming to the formula

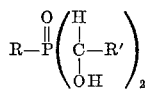

which comprises bringing into reactive contact a primary phosphine oxide corresponding to the formula

and an aldehyde conforming to the formula

R'CHO in the presence of a member selected from the group consisting of an acid and a base and recovering the resulting tertiary phosphine oxide, R in the above formulae represents a member selected from the group consisting of alkyl having from 1 to 18 carbon atoms, branched and straight chain, alkenyl having from 1 to 18 carbon atoms, branched and straight chain, substituted alkyl having from 1 to 18 carbon atoms, branched and straight chain, substituted alkenyl having from 1 to 18 carbon atoms, branched and straight chain; cycloalkyl; phenyl and substituted phenyl; R' represents a member selected from the group consisting of H and the members represented by R, above; and substituents for the alkyl, alkenyl and phenyl members of R, above, being selected from the group consisting of nitrile, lower alkoxy, halogen, hydroxy, and carboxy; and said substituents for alkyl, alkenyl and phenyl members of R', above, being selected from the group consisting of halogen, hydroxy, lower alkoxy, nitro and carboxy.

7. The process of claim 6 wherein the catalyst is a mineral acid.

8. The process of claim 6 wherein the catalyst is a base.

9. The process of claim 6 wherein the reactants are present in about equimolar proportions.

10. A method of preparing secondary phosphine oxides corresponding to the formula

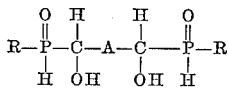

which comprises bringing together into reactive contact a primary phosphine oxide corresponding to the formula

and a dialdehyde conforming to the formula

OHC—A—CHO said reactants being brought together in the presence of a catalyst selected from the group consisting of an acid and a base, and recovering the resulting secondary phosphine oxide.

R in the above formulae representing a member selected from the group consisting of alkyl having from 1 to 18 carbon atoms, branched and straight chain, alkenyl having from 1 to 18 carbon atoms, branched and straight chain, substituted alkyl having from 1 to 18 carbon atoms, branched and straight chain, substituted alkenyl having from 1 to 18 carbon atoms, branched and straight chain; cycloalkyl; phenyl and substituted phenyl; said substituents for alkyl, alkenyl and phenyl, above, being selected from the group consisting of nitrile, lower alkoxy, halogen, hydroxy and carboxy, A being a member selected from the group consisting of lower alkylene, monohydroxy-substituted lower alkylene and phenylene.

11. The process of claim 10 wherein the catalyst is a mineral acid.

12. The process of claim 10 wherein the catalyst is a base.

13. The process of claim 10 wherein the reactants are present in about equimolar proportions.

14. A method of preparing secondary phosphine oxides corresponding to the formula

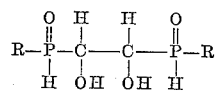

which comprises bringing together into reactive contact a primary phosphine oxide conforming to the formula

and glyoxal, said reactants being brought together in the presence of a catalyst selected from the group consisting of a base and an acid, and recovering the resulting secondary phosphine oxide, R in the above formulae representing a member selected from the group consisting of alkyl having from 1 to 18 carbon atoms, branched and straight chain, alkenyl having from 1 to 18 carbon atoms, branched and straight chain, substituted alkyl having from 1 to 18 carbon atoms, branched and straight chain, substituted alkenyl having from 1 to 18 carbon atoms, branched and straight chain; cycloalkyl; phenyl and substituted phenyl; said substituents for alkyl, alkenyl and phenyl, above, being selected from the group consisting of nitrile, lower alkoxy, halogen, hydroxy and carboxy.

15. The process of claim 14 wherein the catalyst is a mineral acid.

16. The process of claim 14 wherein the catalyst is a base.

17. The process of claim 14 wherein the reactants are present in equimolar proportions.

18. A method of preparing secondary phosphine oxides corresponding to the formula

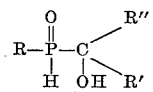

which comprises bringing together into reactive contact a primary phosphine oxide conforming to the formula

and a carbonyl compound corresponding to the formula

said reactants being brought together in the presence of a member selected from the group consisting of an acid and a base, R in the above formulae represents a member selected from the group consisting of alkyl having from 1 to 18 carbon atoms, branched and straight chain, alkenyl having from 1 to 18 carbon atoms, branched and straight chain, substituted alkyl having from 1 to 18 carbon atoms, branched and straight chain, substituted alkenyl having from 1 to 18 carbon atoms, branched and straight chain; cycloalkyl; phenyl and substituted phenyl; said substituents for alkyl, alkenyl and phenyl being selected from the group consisting of nitrile, lower alkoxy, halogen, hydroxy and carboxy; R' is a member of the group consisting of H and the same members represented by R, above, said substituents for alkyl, alkenyl and phenyl represented by R', however, being selected from the group consisting of halogen, hydroxy, lower alkoxy, nitro and carboxy; R'' is a member selected from the group consisting of H, lower alkyl, and phenyl, and R'' taken in conjunction with R' also represents the remainder of a cycloalkyl ring.

19. The process of claim 18 wherein the catalyst is a mineral acid.

20. The process of claim 18 wherein the catalyst is a base.

21. The process of claim 18 wherein the reactants are present in equimolar proportions.

References Cited in the file of this patent
UNITED STATES PATENTS

| | | |
|---|---|---|
| 2,584,112 | Brown | Feb. 5, 1952 |
| 3,005,029 | Buckler et al. | Oct. 17, 1961 |